United States Patent [19]
Remson

[11] Patent Number: 5,239,453
[45] Date of Patent: * Aug. 24, 1993

[54] DC TO DC CONVERTER EMPLOYING A FREE-RUNNING SINGLE STAGE BLOCKING OSCILLATOR

[75] Inventor: Joseph D. Remson, San Jose, Calif.

[73] Assignee: Rolm Company (Formerly Rolm Systems), Santa Clara, Calif.

[*] Notice: The portion of the term of this patent subsequent to Dec. 3, 2008 has been disclaimed.

[21] Appl. No.: 824,711

[22] Filed: Jan. 17, 1992

Related U.S. Application Data

[63] Continuation of Ser. No. 631,575, Dec. 21, 1990.

[51] Int. Cl.⁵ .......................................... H02M 3/335
[52] U.S. Cl. ......................................... 363/19; 363/89; 363/97; 363/131; 323/266; 323/274
[58] Field of Search ................ 323/266, 273–278; 363/18, 19, 89, 97, 124, 131

[56] References Cited

U.S. PATENT DOCUMENTS

| | | | |
|---|---|---|---|
| 2,799,738 | 7/1957 | Mortimer | 363/18 |
| 2,915,710 | 12/1959 | Schiewe et al. | 363/18 |
| 2,958,032 | 10/1960 | Vogt | 363/18 |
| 3,391,322 | 7/1968 | Findley, Jr. et al. | 363/23 |
| 3,478,256 | 11/1969 | Tomota | 323/266 |
| 3,548,291 | 12/1970 | Heaslett | 323/266 |
| 3,573,596 | 4/1971 | Kamil | 363/18 |
| 3,916,294 | 10/1975 | Kennedy | 323/275 |
| 4,150,423 | 4/1979 | Boschert | 363/97 |
| 4,378,585 | 3/1983 | Bete | 363/19 |
| 4,722,041 | 1/1988 | Ishikawa | 363/18 |
| 4,745,535 | 5/1988 | Sugishima et al. | 363/19 |
| 4,783,795 | 11/1988 | Yahata | 323/266 |
| 4,931,918 | 6/1990 | Inou et al. | 363/19 |
| 5,029,062 | 7/1991 | Capel | 363/97 |
| 5,070,439 | 12/1991 | Remson | 323/266 |

FOREIGN PATENT DOCUMENTS 493775 2/1976 U.S.S.R. ............................. 323/278

Primary Examiner—Jeffrey Sterrett

[57] ABSTRACT

A DC to DC converter employs a single ended blocking oscillator which employs a transformer having a primary winding and a plurality of secondary windings. The transformer has a core which is of a square loop hysteresis type. The blocking oscillator is supplied operating voltage by means of a voltage regulator circuit which operates to regulate the voltage applied to the blocking oscillator according to both input voltage variations and output load variations. Due to circuit operation, the output voltage is extremely well regulated while having low ripple. An output secondary winding of the transformer is coupled to a rectifier. The rectifier output is fed back to the regulator to control the voltage applied to the blocking oscillator to cause the blocking oscillator to provide a waveform to maintain the output voltage constant.

15 Claims, 4 Drawing Sheets

$V_{CEQ4}$ $V_{RE}$

OUTPUT VOLTAGE $I_{CR3}$

DC TO DC CONVERTER EMPLOYING A FREE-RUNNING SINGLE STAGE BLOCKING OSCILLATOR

This is a continuation of application Ser. No. 07/631,575 filed Dec. 21, 1990.

BACKGROUND OF THE INVENTION

This invention generally relates to power supplies and more particularly to a DC to DC converter employing a single stage blocking oscillator.

DC to DC converters are well known and operate to convert an available DC input voltage to a DC output voltage or multiple output voltages with isolation between the input and the output. Such converters normally utilize high frequency switching techniques to enable one to achieve small transformer size which, in turn, provides isolation and voltage scaling. There are many different types of converters each having specific advantages and disadvantages. For example, square wave inverter stages may be used where the secondary voltage of a transformer is rectified and filtered to provide a desired DC output. With the square wave inverter the output voltage is not regulated and is a function of the input voltage and load current. However, for fixed input voltages and fixed loads, the output voltage may be maintained to a desired voltage tolerance. Where voltage output regulation is required due to input voltage and output load variations, regulation is conveniently achieved by pulse width modulation which controls the conduction period or duty cycle of an active device. As indicated a DC input source may be employed but most frequently a rectified and filtered AC input source serves as the DC source as in the case of off-line switch mode power supplies. Low power converters typically employ bipolar transistors or MOSFETs while very high power converters normally employ SCRs as switching elements. Each different approach has certain advantages. In the prior art it has been known, for example, to employ a free-running oscillator or a free-running circuit configuration to convert the DC voltage to an AC voltage which AC voltage is then rectified to produce a final output DC voltage. The term "free-running converter" implies that the operation of the converter is controlled by volt-second parameters of magnetic components. The switching frequency and the output voltage vary as a function of input voltage and load current. These converters are ideal for low power requirements and for operation from a fixed voltage source and into a fixed load. Essentially the prior art employed various free-running configurations to implement such converters including blocking oscillators and other circuit configurations. For examples of typical converter operation reference is made to a text entitled PRINCIPLES OF SOLID STATE POWER CONVERSION by Ralph E. Tarter (1985) published by Howard W. Sams & Company, Inc. As one can ascertain, while DC to DC converters are well known, there are many problems associated with each different approach and such problems have to be resolved accordingly. These problems relate to regulation of the output voltage, the amount of ripple, volumetric size, as well as the overall economics.

It is therefore an object of the present invention to provide a compact DC output voltage source having a regulated output voltage including low ripple.

It is a further object of the present invention to provide a regulated output DC voltage source having low ripple, small size, and which is relatively inexpensive to produce.

SUMMARY OF THE INVENTION

A DC to DC converter apparatus, comprising: a blocking oscillator including a transistor having a base, collector and emitter electrode, with the emitter electrode coupled to a point of reference potential, a transformer having a primary winding and a first and second secondary winding, with a first terminal of said primary winding coupled to said collector electrode of said transistor, and with the second terminal of said primary winding adapted to receive operating potential, with the base electrode of said transistor coupled to one terminal of said first secondary winding and with the other terminal of said first secondary winding adapted to receive operating potential, to cause said blocking oscillator to provide a high frequency output waveform; rectifier means coupled to said second secondary winding to provide an output voltage by rectifying said high frequency output waveform as present on said second secondary winding; voltage regulator means coupled to said second terminal of said primary winding and said other terminal of said first secondary winding and adapted to apply regulated voltage thereto; and means coupled between said rectifier means and said voltage regulator means and operative to vary the value of said regulated voltage according to the value of said output voltage and according to the temperature of operation and always in a direction to maintain said output voltage constant.

DETAILED DESCRIPTION OF THE INVENTION

Figure 1:
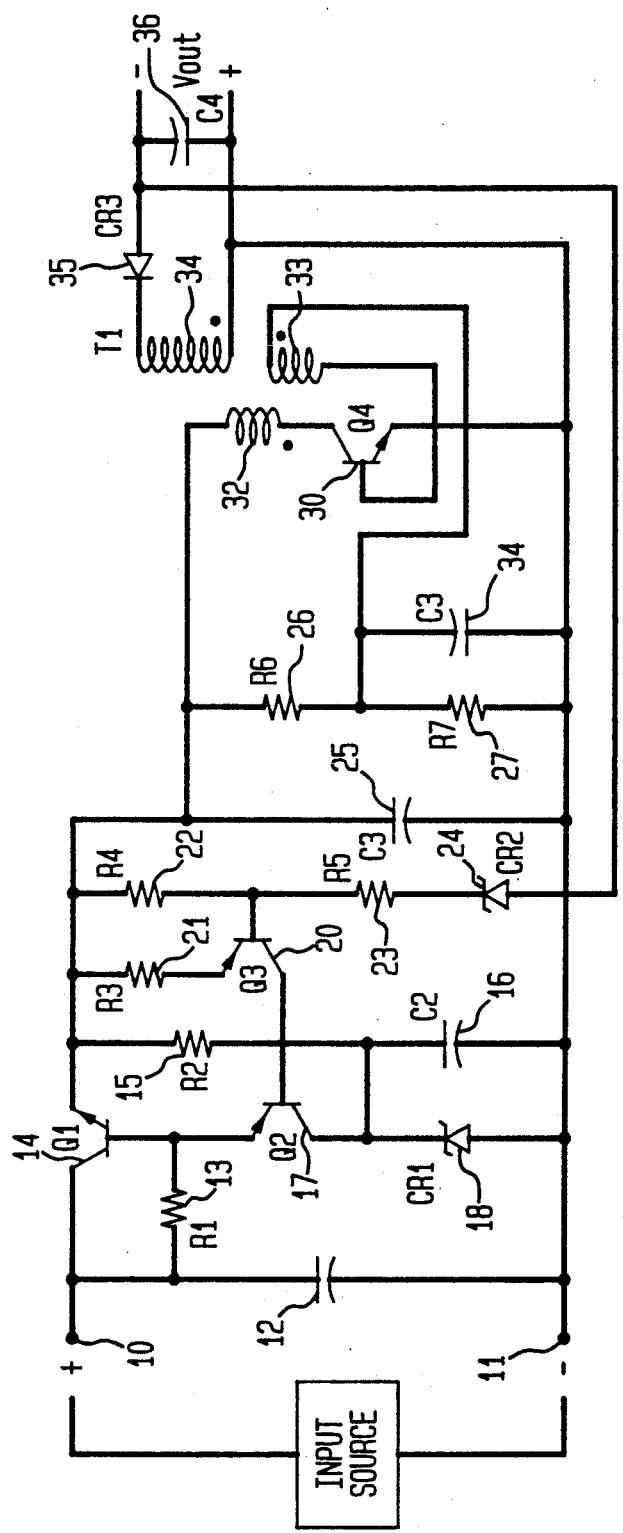
FIG. 1 is a detailed schematic diagram of a single stage blocking oscillator used in a DC to DC converter according to this invention.
Figure 2A:
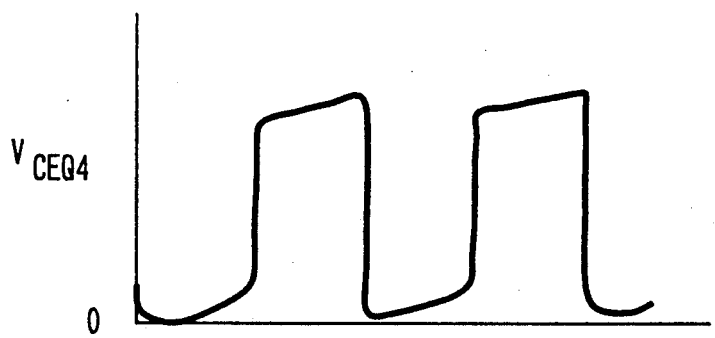
FIGS. 2A to 2D are a series of waveforms useful in explaining operation of the invention.
Figure 2B:
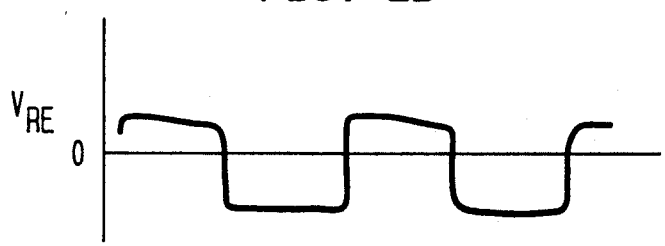
Figure 2C:
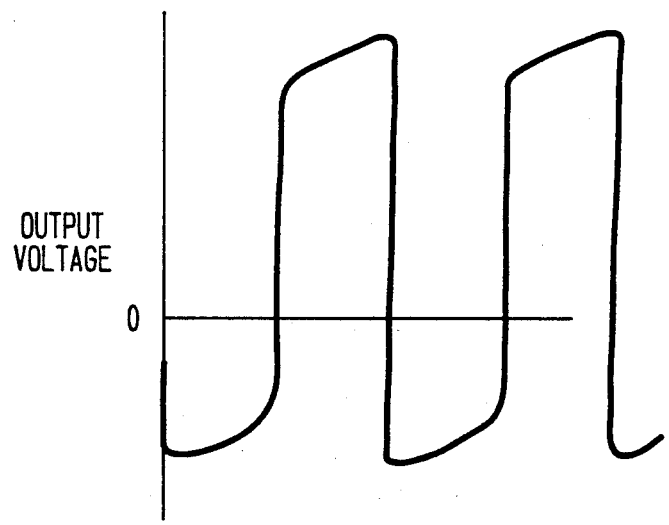
Figure 2D:
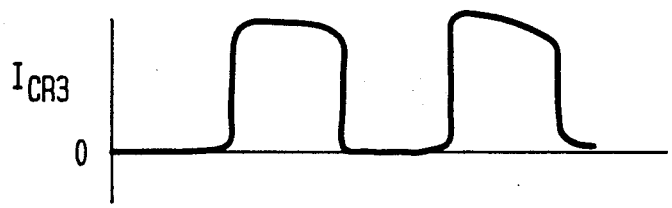
Figure 3:
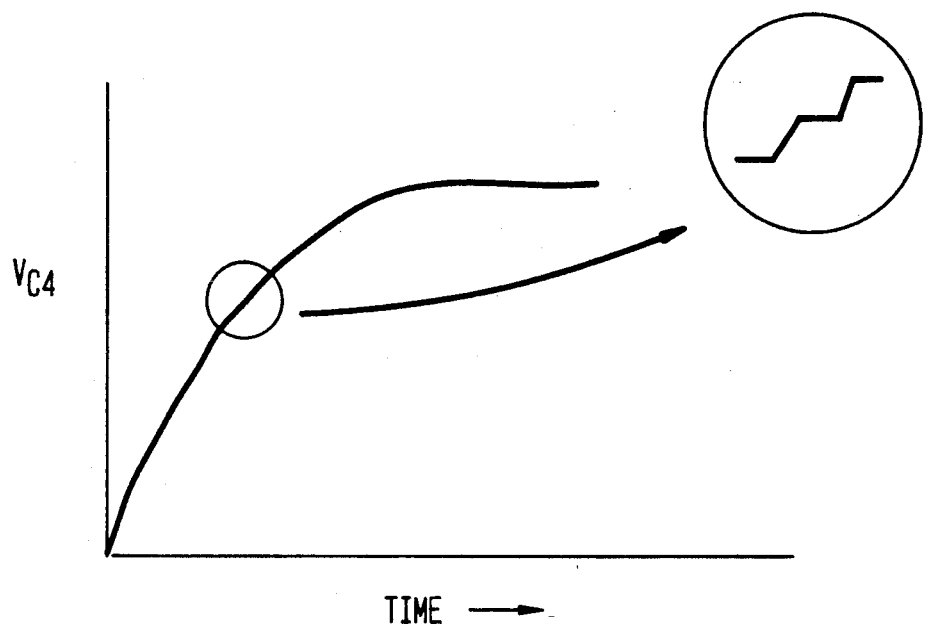
FIG. 3 is a waveform showing the charging of an output capacitor used in this invention.
Figure 4:
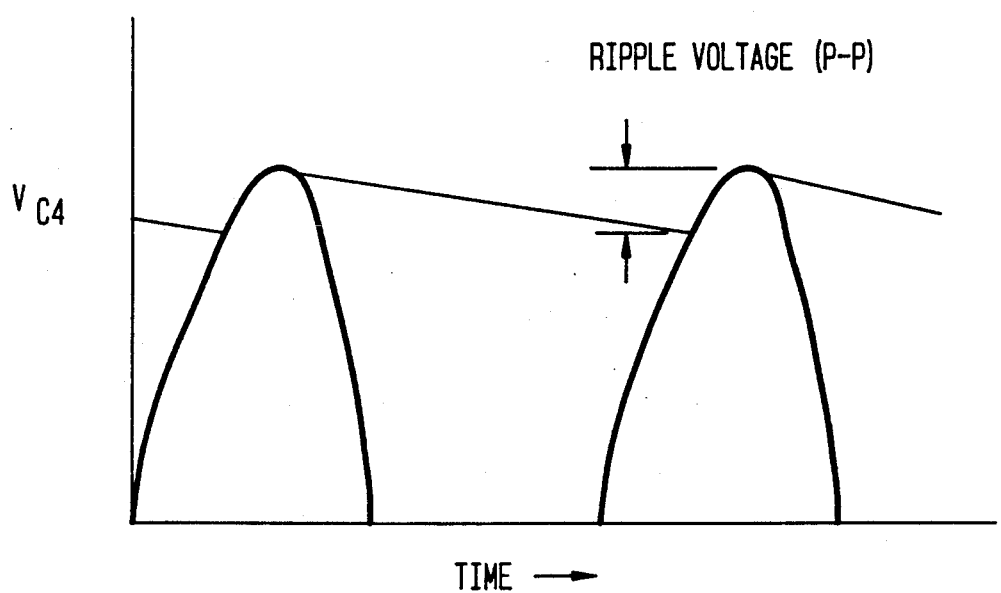
FIG. 4 is a waveform necessary to explain ripple operation.
Figure 5:
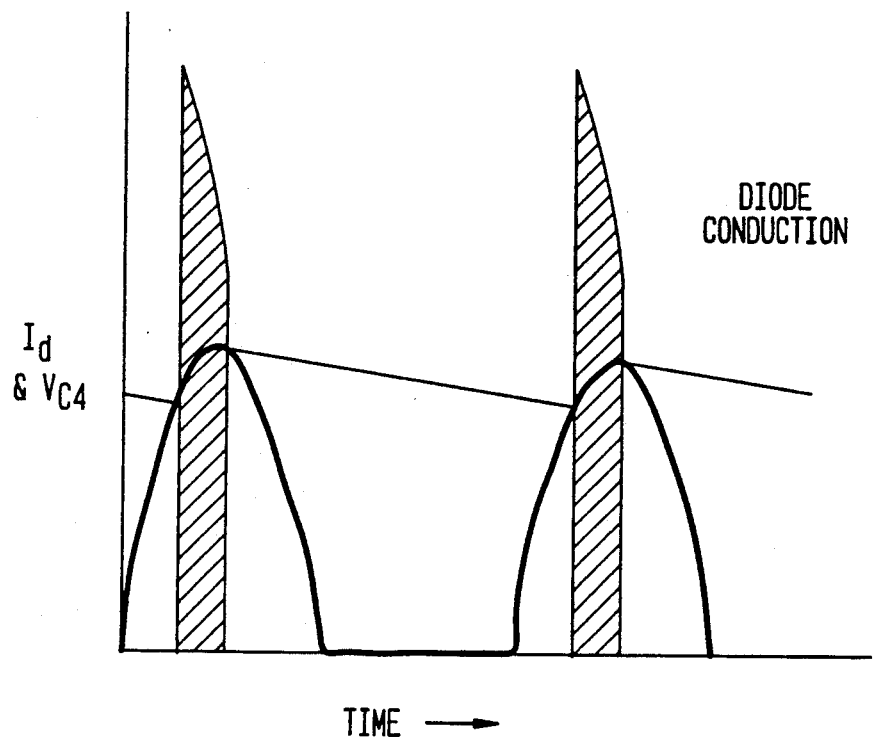
FIG. 5 is an additional waveform useful in explaining circuit operation.
Figure 6:
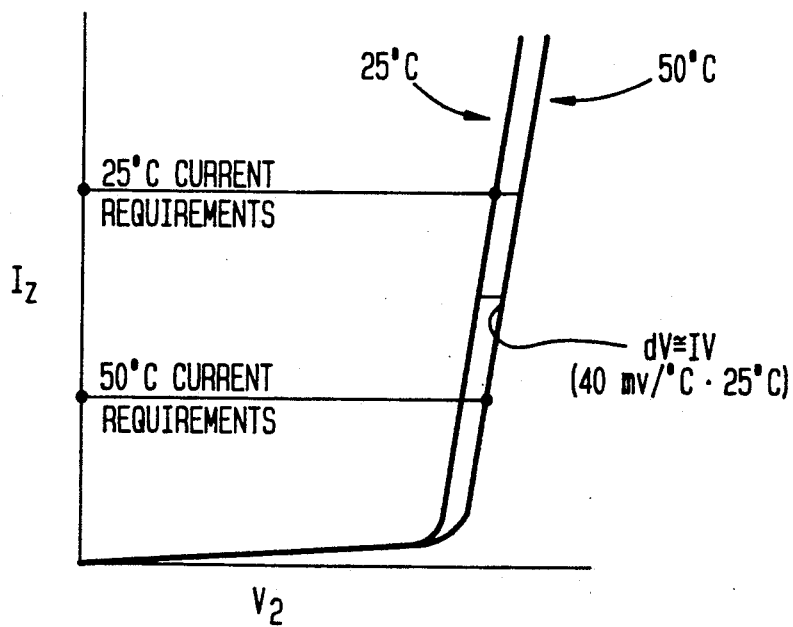
FIG. 6 is a graph depicting current and voltage operation of a Zener diode used in this invention.

Referring to FIG. 1 there is shown a compact regulated voltage source which exhibits output regulation and low ripple using a DC to DC converter which, in this case, is a single stage blocking oscillator. The voltage source of FIG. 1 is particularly useful in systems with volumetric limitations, where line and load regulation is required, line to load and load to line noise isolation is required, and where electrical noise would cause degradation of signal quality of the system. For example, the power supply described in FIG. 1 can be utilized in telephone systems which utilize voice or audio signals and due to the frequency of operation of the supply, these signals will not be interfered with. Essentially, the supply of FIG. 1 consists of an input regulator stage which supplies a regulated voltage to a single stage blocking oscillator including a transistor 30. The blocking oscillator generates a square waveform which is rectified at the secondary winding by means of a rectifier 35 to produce an output DC voltage. The circuit shown in FIG. receives an input voltage at terminals 10 and 11 also designated as "+" and "−". The input voltage may come from a DC source or from an AC supply which is rectified and converted to a suitable DC. The purpose of a DC to DC converter is to convert DC at terminals 10 and 11 to a different level output DC across output capacitor 36 which is coupled across the secondary winding 34 of the transformer T1 as will be explained. The positive terminal 1 is coupled to the collector electrode of an NPN transistor 14 arranged in a common emitter configuration. The emitter electrode of transistor 14, as will be explained, supplies a regulated voltage for operation and control of the blocking oscillator including transistor 30. In this manner the emitter electrode of transistor 14 is coupled to one terminal of resistor 26 and to one terminal of the primary winding 32 of the transformer T1. Transformer T1 is associated with the blocking oscillator. The emitter electrode of transistor 14 is returned to the point of reference potential via resistor 15 in series with capacitor 16. Transistor 14 is biased in the "ON" condition by means of the resistor 13 which is coupled between terminal 10 and the base electrode of transistor 14. The base electrode of transistor 14 is also coupled to the collector electrode of NPN transistor 17 having its emitter electrode coupled to the point of reference potential through the Zener diode 18. Capacitor 16 is in shunt with the Zener diode 18 and serves to aid in providing a stable potential at the emitter electrode. The base electrode of transistor 17 is coupled to the collector electrode of PNP transistor 20 having the emitter electrode coupled via resistor 21 to the emitter electrode of transistor 14. The base electrode of transistor 20 is directed to the emitter electrode of transistor 14 via resistor 22. The base electrode is further coupled to a feedback circuit consisting of resistor 23 in series with Zener diode 24. The anode electrode of Zener diode 24 is coupled to the anode electrode of rectifier 35 to provide feedback from the output rectifier circuit to the voltage regulator. As indicated, the emitter electrode of transistor 14 supplies operating potential to the blocking oscillator including transistor 30. The emitter electrode of transistor 14 is shunted by means of capacitor 25 which acts as a filter capacitor. Transistor 30 has its collector electrode coupled to one terminal of the primary winding 32 of transformer T1. The other terminal of the primary winding 32 is coupled to the emitter electrode of transistor 14. The base electrode of transistor 30 is coupled through secondary winding 33 of transformer T1 to the junction between resistors 26 and 27, forming a voltage divider between the emitter electrode of transistor 14 and the point of reference potential. Capacitor 34 by-passes resistor 27 to stabilize the voltage at the junction and therefore at the base electrode. The transformer T1 is of the type having a square loop hysteresis curve and also has an output secondary winding 34. The output secondary winding 34 has one terminal coupled to the point of reference potential with the other terminal coupled to the cathode of the diode 35. The anode of diode 35 is coupled to the anode of diode 24 which, as indicated, is coupled to the base electrode of transistor 20 forming part of the voltage regulator. The diode 35 in conjunction with capacitor 36 and the secondary winding 34 operates to rectify the square wave produced by the blocking oscillator 3 and to provide a DC voltage across capacitor 36. This voltage provides the DC output voltage for the system. As indicated in FIG. 1, the dots associated with the transformer windings are indicative of the direction of current flow as is conventional. The operation of the circuit is as follows. The application of voltage to the primary winding 32 of transformer T1 and the application of this voltage to resistor 26 will bias transistor 30 into conduction. As transistor 30 conducts the base drive to the transistor is increased by the secondary winding 33. The phase of the voltage at the secondary winding 34 is such that diode 35 is reverse biased. As the transformer approaches saturation due to the increased current flow through transistor 30, the change in the magnetic field decreases and the voltage produced by the secondary winding 33 decreases. This decrease in drive voltage causes transistor 30 to decrease conduction. As the current in the transformer begins to decrease the magnetic field starts to collapse causing the voltage at the base electrode of transistor 30 to reverse, thereby driving the transistor into cut-off. The magnetic field in the transformer would normally collapse at a very high rate but diode 35 is now forward biased. In this manner some current will flow as capacitor 36 is charged, limiting the collapse rate. When the current into capacitor 36 approaches zero, the magnetic field ceases to change and transistor 30 will be biased on by means of resistors 26 and 33. Once more energy is stored in the magnetic field and the cycle resumes. The frequency at which the circuit runs is related to the voltage level across capacitor 36. Each cycle charges capacitor 36 a smaller amount than the previous cycle. This operation is shown in FIG. 3 whereby the voltage across capacitor 36 is shown with respect to time, indicating the charging of capacitor 36. It is understood that diode 35 is employed as a half-wave voltage rectifier. Since the level of the output voltage remains reasonably square, the diode 35 virtually conducts through the entire half-cycle. The waveforms developed by the circuit are shown in FIGS. 2A–2D. FIG. 2A shows the voltage between the collector and emitter electrode of transistor 30. FIG. 2B shows the voltage between the base and emitter junction of transistor 30. FIG. 2C shows the output voltage which is developed across the transformer winding 34 while FIG. 2D shows the current through diode 35. As one can ascertain, the voltage across an inductance is equal to the value of the inductance times the rate of change of current with respect to time. By this relationship it is noted that if the current is large and the voltage is low, then the pulse period is long, hence providing a low operating frequency. If, however, the current is close to zero and the voltage is large, then the pulse period tends to be very short, thus specifying a higher operating frequency. The circuit shown in FIG. 1 changes its operating frequency as a function of the load it is required to supply power to. The energy stored in the magnetic field is easily determined which, in turn, specifies the size of the transformer T1 and the related components relative to the load energy requirements. In this manner the supply operates at a frequency beyond the passband of the system and produces virtually no ripple in its output. In general terms, if the power supply is developed from a sine wave source, the ripple voltage appears as shown in FIG. 4. As one can see, the voltage drops between peaks of the sine wave because the charge on the capacitor 36 will cause diode 35 to be reverse biased. Therefore, diode 35 conducts for a very short period of time as shown in FIG. 5. During the interval between conduction of the diode, the voltage across capacitor 36 will start to follow a logarithmic decay causing a high ripple voltage to appear on the output. As the output voltage increases, diode 24 eventually will avalanche. This causes the base voltage of transistor 20 to move in a negative direction turning transistor 20 on. When transistor 20 starts to conduct, transistor 17 will start to conduct. The current normally flowing in the base to emitter junction of transistor 14 will be reduced by becoming the collector current for transistor 17. In this manner the voltage at the emitter electrode of transistor 14 is controlled to keep the output voltage across capacitor 36 constant. Regulation is achieved such that if the output voltage rises due to load shifts or input voltage increases, then transistor 20 conducts more as does transistor 17 which causes transistor 14 to conduct less, reducing the input voltage at transformer T1. If the output voltage decreases due to increased loading or a reduction in the input voltage, then transistor 20 conducts less as does transistor 17. Conduction in transistor 14 increases and the voltage at T1 is increased. Diode 18 and the large Vbe of transistors 17 and 20 form a temperature compensation network in conjunction with diode 24. As the temperature increases, the Zener voltage and the voltage between the base and emitter of transistors 20 and 17 decreases. This effectively causes transistor 14 to conduct less. However, most high voltage Zener diodes tend to drift in a positive direction with temperature. Since less current is required to cause the regulator to decrease the output of the system, the operating point on diode 24's curve shifts towards a lower voltage point. This operation is shown in FIG. 6. This compensates, in part, for the increase in the Zener voltage of diode 24. Properly balanced, the net effect is a minimal change in the output voltage over the operating temperature range. It is indicated that if the output voltage were to remain steady, changes in the input voltage would cause the proper corrections to take place by means of transistors 17 and 20. That is, if the voltage increased, then transistor 20 would increase conduction causing transistor 17 to conduct more, decreasing the conduction of transistor 14 and hence keeping the system stable. The voltage between the base and emitter electrodes of transistors 14, 17, and 20 decrease about 2.2 millivolts per degree Centigrade. Feedback from the output is obtained by means of temperature stable components and diode 18 should have a positive temperature coefficient. Typical drift values for Zener diodes in a range of 6.3 to 6.8 volts is an increase of about 2.2 millivolts per degree Centigrade. These values virtually offset each other and all temperature drifts. The use of diode 24 in the feedback path provides a higher percentage of the variation in the output when using only resistors. It can be shown that the use of the diode 24 in the feedback path improves the control over output variations without an excessive gain required in the regulator circuit. The ripple voltage in line powered power supplies can be calculated and it can be seen that the higher the frequency of operation, the smaller the size of the output capacitor and hence the smaller the power supply can be. Enormous reductions in capacitor size, hence reduced volume requirements and cost can be achieved if the frequency of operation is increased. An operating frequency of 25 Khz or greater represents a reasonable choice. This frequency range was selected based on availability of high speed rectifiers, transformer cores, and also to be sufficiently high above the audio range as to not interfere with these signals. An additional advantage of this type of power supply is that the switching action of the blocking oscillator provides filtering. In this manner only signals of a frequency equal to the operating frequency and within a certain phase relationship will be able to get through the DC to DC converter. This provides for electromagnetic interference isolation of the equipment from the line and the line from the equipment. The circuit provides a high frequency of operation while reducing the ripple in the output section. The output voltage is compensated for changes in input voltage, the load applied to the circuit, as well as changes in ambient temperature. Switching action acts as a synchronous demodulator such that only signals of the same frequency having proper phase angles will be passed. This provides a very high level of isolation between the load and the line as required for FCC compliance.

I claim:

1. A DC to DC converter apparatus, comprising: a free running blocking oscillator including a first transistor having base, collector and emitter electrodes, with the emitter electrode coupled to a point of reference potential, a transformer having a primary winding and first and second secondary windings said transformer having a core exhibiting a square hysteresis loop, with a first terminal of said primary winding coupled to said collector electrode of said first transistor, and with the second terminal of said primary winding adapted to receive operating potential, with the base electrode of said first transistor coupled to a first terminal of said first secondary winding and with the second terminal of said first secondary winding adapted to receive said operating potential, to cause said blocking oscillator to self oscillate to provide a high frequency output waveform;

rectifier means coupled to said second secondary winding to provide an output voltage by rectifying said high frequency output waveform as present on said second secondary winding;

voltage regulator means coupled to said second terminal of said primary winding and said second terminal of said first secondary winding and adapted to supply a regulated voltage thereto; and compensating means coupled to receive the rectified high frequency output waveform from said rectifier means and to provide an input signal to said voltage regulator means to vary the value of said regulated voltage according to the value of said output voltage an according to the temperature of operation and always in a direction to maintain said output voltage constant.

2. The DC to DC converter according to claim 1, wherein said first transistor is an NPN transistor.

3. The DC to DC converter according to claim 1, wherein said rectifier means is a half-wave rectifier having a diode with the cathode electrode of said diode coupled to a first terminal of said second secondary winding, a capacitor having one terminal coupled to said anode electrode of said diode and the other terminal coupled to the second terminal of said secondary winding to provide a DC output voltage across said capacitor.

4. The DC to DC converter according to claim 1, wherein said high frequency output waveform from said blocking oscillator has a frequency of at least about 25 kHz.

5. The DC to DC converter according to claim 1, wherein said voltage regulator means includes first and second input terminals for receiving a source of potential, a second transistor of a given conductivity having a base collector and emitter electrode, with the collector electrode coupled to said first terminal and with the emitter electrode coupled to said second terminal of said primary winding and to said other terminal of said first secondary winding, a third transistor of the same conductivity as said second transistor, having a base collector, and emitter electrode with the collector electrode of said third transistor coupled to the base electrode of said second transistor and with the emitter electrode coupled to said second input terminal, control means coupling the base electrode of said third transistor to said compensating means controlling the emitter output of said second transistor according to the rectification of said high frequency square wave.

6. The DC to DC converter according to claim 5, further including a capacitor coupled between said second input terminals.

7. The DC to DC converter according to claim 5, wherein said control means includes a fourth transistor of opposite conductivity to said second and third and having a base, emitter and collector electrode with the collector electrode of said fourth transistor coupled to the base electrode of said third transistor and with the emitter electrode of said fourth transistor coupled to the emitter electrode of said second transistor and with the base electrode of said fourth transistor coupled to said compensating means via a diode to provide control of said second transistor according to the magnitude of said output voltage.

8. The DC to DC converter according to claim 7, wherein said diode is a first Zener diode.

9. The DC to DC converter according to claim 8, further including a biasing resistor coupled between the base electrode of said second transistor and said first input terminal.

10. The DC to DC converter according to claim 8, further including a Zener diode having an anode and cathode electrode, with the cathode electrode coupled to the emitter electrode of said third transistor and with the anode electrode coupled to said second input terminal.

11. The DC to DC converter according to claim 10, further including a capacitor coupled across said second Zener diode.

12. The DC to DC converter according to claim 5, further including a DC input source of a lower voltage than said output voltage from said rectifier means and adapted to be applied between said first and second input terminals.

13. The DC to DC converter according to claim 5, further including a capacitor coupled between electrode of said third transistor and said second input terminal.

14. The DC to DC converter according to claim 5, wherein said second and third transistors are NPN devices.

15. The DC to DC converter according to claim 14, wherein said fourth transistor is a PNP device.

* * * * *